United States Patent
Kairali et al.

(10) Patent No.: US 10,986,178 B2
(45) Date of Patent: Apr. 20, 2021

(54) EXECUTION OF DATA LOGGING IN A NETWORKED COMPUTING ENVIRONMENT

(71) Applicant: International Business Machines Corporation, Armonk, NY (US)

(72) Inventors: Sudheesh S. Kairali, Kozhikode (IN); Vijay R. Kalangumvathakkal, Pathanamthitta (IN); Rohit S. Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 15/397,880

(22) Filed: Jan. 4, 2017

(65) Prior Publication Data
US 2018/0191822 A1    Jul. 5, 2018

(51) Int. Cl.
*G06F 15/16* (2006.01)
*H04L 29/08* (2006.01)
*H04L 12/24* (2006.01)

(52) U.S. Cl.
CPC ........ *H04L 67/1095* (2013.01); *H04L 41/069* (2013.01); *H04L 67/02* (2013.01)

(58) Field of Classification Search
CPC ... H04L 67/1095; H04L 43/16; H04L 41/069; H04L 67/02
USPC .......................................................... 709/219
See application file for complete search history.

(56) References Cited

U.S. PATENT DOCUMENTS

2012/0042210 A1* 2/2012 Glaser ................. G06F 11/3684
714/38.1
2012/0089664 A1* 4/2012 Igelka ................... G06F 9/5083
709/203
2016/0156662 A1 6/2016 Nagaratnam et al.
2016/0198325 A1 7/2016 Harishankar et al.
2016/0205007 A1* 7/2016 Syed ....................... H04L 67/22
709/224

FOREIGN PATENT DOCUMENTS

WO      2015/065353 A1    5/2015
WO      2016/083925 A1    6/2016

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.
Mell, P. et al., "The NIST Definition of Cloud Computing", National Institute of Standards and Technology, Information Technology Laboratory, Vers. 15, Oct. 7, 2009, 2 pages.

* cited by examiner

*Primary Examiner* — Dustin Nguyen
*Assistant Examiner* — Joel Mesa
(74) *Attorney, Agent, or Firm* — Nicholas D. Bowman; Hunter E. Webb; Keohane & D'Alessandro, PLLC

(57) ABSTRACT

Embodiments of the present invention provide systems and methods for organization of data logging in a networked computing environment. A plurality of logging and monitoring zones, referred to as "logmon" zones are defined. Each zone is associated with one or more policies. The policies specify various parameters such as storage limits, priority, periodicity, and retention time, among others. A networked application operating in a cloud (networked) environment is associated with a zone. The tenant for the application can be billed according to the zone.

19 Claims, 10 Drawing Sheets

App Name: myCloudApp

| Periodicity | 10 min ○ | 1 hour ● | 3 hours ○ | | 300 302 304 |
|---|---|---|---|---|---|

FIG. 3

EXECUTION OF DATA LOGGING IN A NETWORKED COMPUTING ENVIRONMENT

FIELD OF THE INVENTION

The invention relates generally to the execution of data logging in a networked cloud computing environment.

BACKGROUND

Data logging involves collecting and storing data over a period of time in order to analyze specific trends or record the events and actions of a system or network environment. It enables the tracking of all interactions through which data, files, or applications are stored, accessed, or modified on a storage device or application. Typically data logging records events and actions, such as the data size, most recent modification, and username of the individual that modified the data. Data logging also allows information security and auditing staff to analyze system access information and assess audit trails to trace viruses and identify suspicious activities.

Data monitoring can include querying the logs, either in real-time, or offline, to check for system integrity, verify the functionality of the application, and identify any errors or warnings that may occur. Together, data logging and monitoring are an important part of managing cloud-based networked computing applications.

Data logging and monitoring uses resources such as storage and network bandwidth. Therefore, it is desirable to have improvements in data logging and monitoring to efficiently use these resources while still effectively monitoring the behavior of cloud-based applications.

SUMMARY

In an aspect, embodiments provide a computer-implemented method for processing application log data transfer in a networked computing environment, comprising: establishing a plurality of logmon zones for the networked computing environment; receiving a request for a cloud resource from a tenant for one or more cloud applications belonging to the tenant; receiving a logmon preference dataset for each of the one or more cloud applications; and associating each of the one or more cloud applications to a logmon zone based on the logmon preference dataset.

In another aspect, embodiments provide a computer system comprising: a processor; a memory coupled to the processor, the memory containing instructions, that when executed by the processor, perform the steps of: establishing a plurality of logmon zones for a networked computing environment; receiving a request for a cloud resource from a tenant for one or more cloud applications belonging to the tenant; receiving a logmon preference dataset for each of the one or more cloud applications; and associating each of the one or more cloud applications to a logmon zone based in the logmon preference dataset.

In yet another aspect, embodiments provide a computer program product for processing application log data transfer in an electronic computing device comprising a computer readable storage medium having program instructions embodied therewith, the program instructions executable by a processor to cause the electronic computing device to: establish a plurality of logmon zones for a networked computing environment; receive a request for a cloud resource from a tenant for one or more cloud applications belonging to the tenant; receive a logmon preference dataset for each of the one or more cloud applications; and associate each of the one or more cloud applications to a logmon zone based on the logmon preference dataset.

BRIEF DESCRIPTION OF THE DRAWINGS

Features of the disclosed embodiments will be more readily understood from the following detailed description of the various aspects of the invention taken in conjunction with the accompanying drawings.

FIG. 3 is a user interface for associating a logmon zone with an application.

Figure 1:
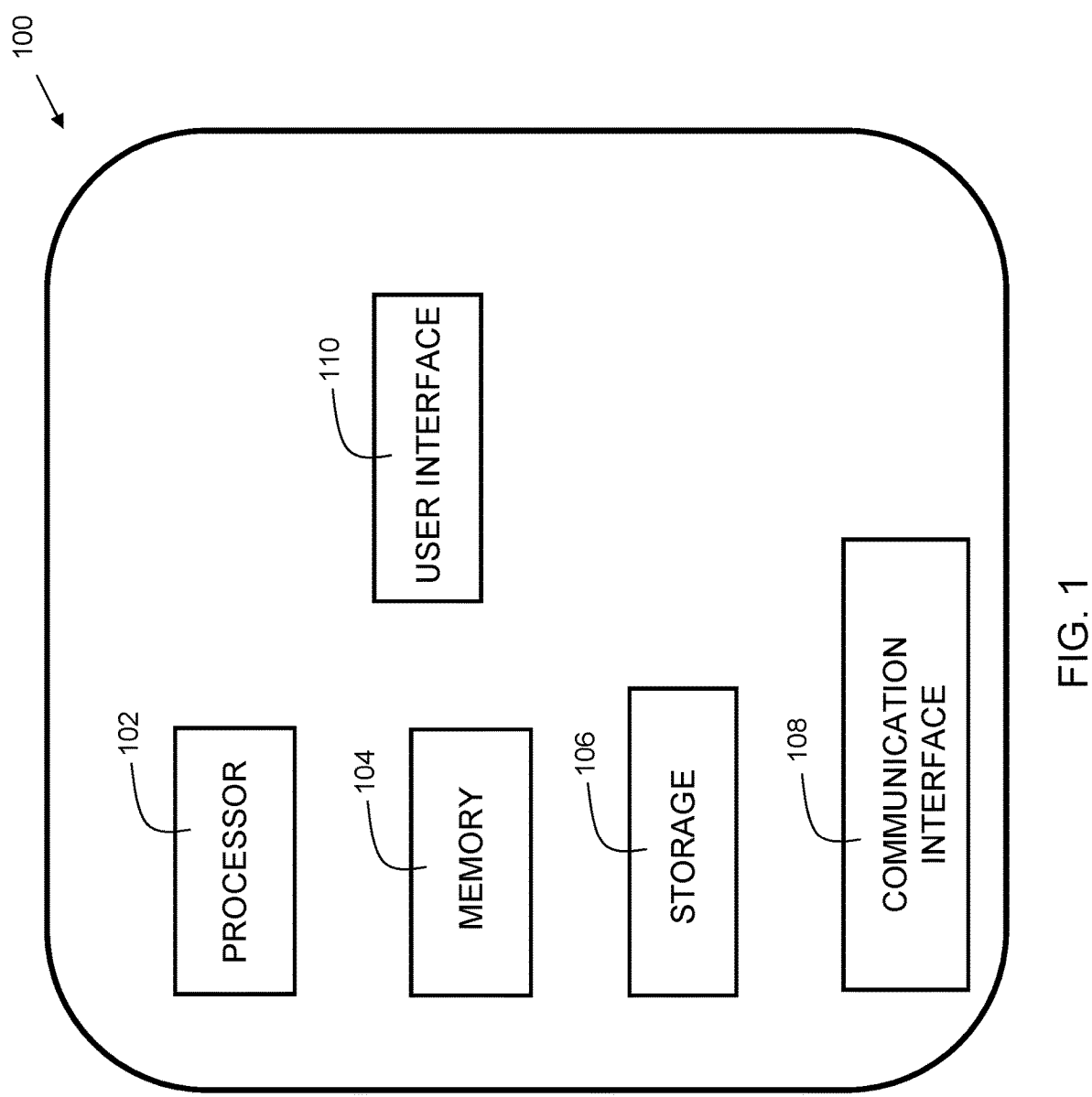
FIG. 1 is a device block diagram for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Embodiments of the present invention provide systems and methods for organization of data logging in a networked computing environment. A plurality of logging and monitoring zones, referred to as "logmon" zones are defined. Each zone is associated with one or more policies. The policies specify various parameters such as, for example, storage limits, priority, periodicity, and/or retention time, among others. A networked application operating in a cloud (networked) environment is associated with a zone. The tenant for the application can be billed according to the zone. The tenant can use disclosed embodiments to track zone usage by application, and/or by the total logging use. This provides tenants the flexibility to easily tailor the logging/monitoring fees to their business and/or application needs.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is a device block diagram for embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se.

Device 100 further includes storage 106. In embodiments, storage 106 may include one or more magnetic storage devices such as hard disk drives (HDDs). Storage 106 may additionally include one or more solid state drives (SSDs). In embodiments, the HDDs may include ATA, SATA, and/or IDE drives. In some embodiments, the HDDs may be configured in a RAID configuration.

The memory 104 and storage 106 together provide memory for multiple applications to execute on processor 102. In embodiments, device 100 may have multiple processors 102, and/or multiple cores per processor. The device 100 may execute an operating system that provides virtual memory management for the device 100. Memory 104 includes instructions, which when executed by processor(s) 102, execute steps of embodiments of the invention.

Device 100 further includes a user interface 110, examples of which include a liquid crystal display (LCD), a plasma display, a cathode ray tube (CRT) display, a light emitting diode (LED) display, an organic LED (OLED) display, or other suitable display technology. The user interface 110 may further include a keyboard, mouse, or other suitable human interface device. In some embodiments, user interface 110 may be a touch screen, incorporating a capacitive or resistive touch screen in some embodiments.

The device 100 further includes a communication interface 108. The communication interface 108 may be a wired communication interface that includes Ethernet, Gigabit Ethernet, or the like. In embodiments, the communication interface 108 may include a wireless communication interface that includes modulators, demodulators, and antennas for a variety of wireless protocols including, but not limited to, Bluetooth™, Wi-Fi, and/or cellular communication protocols for communication over a computer network.

Figure 2:
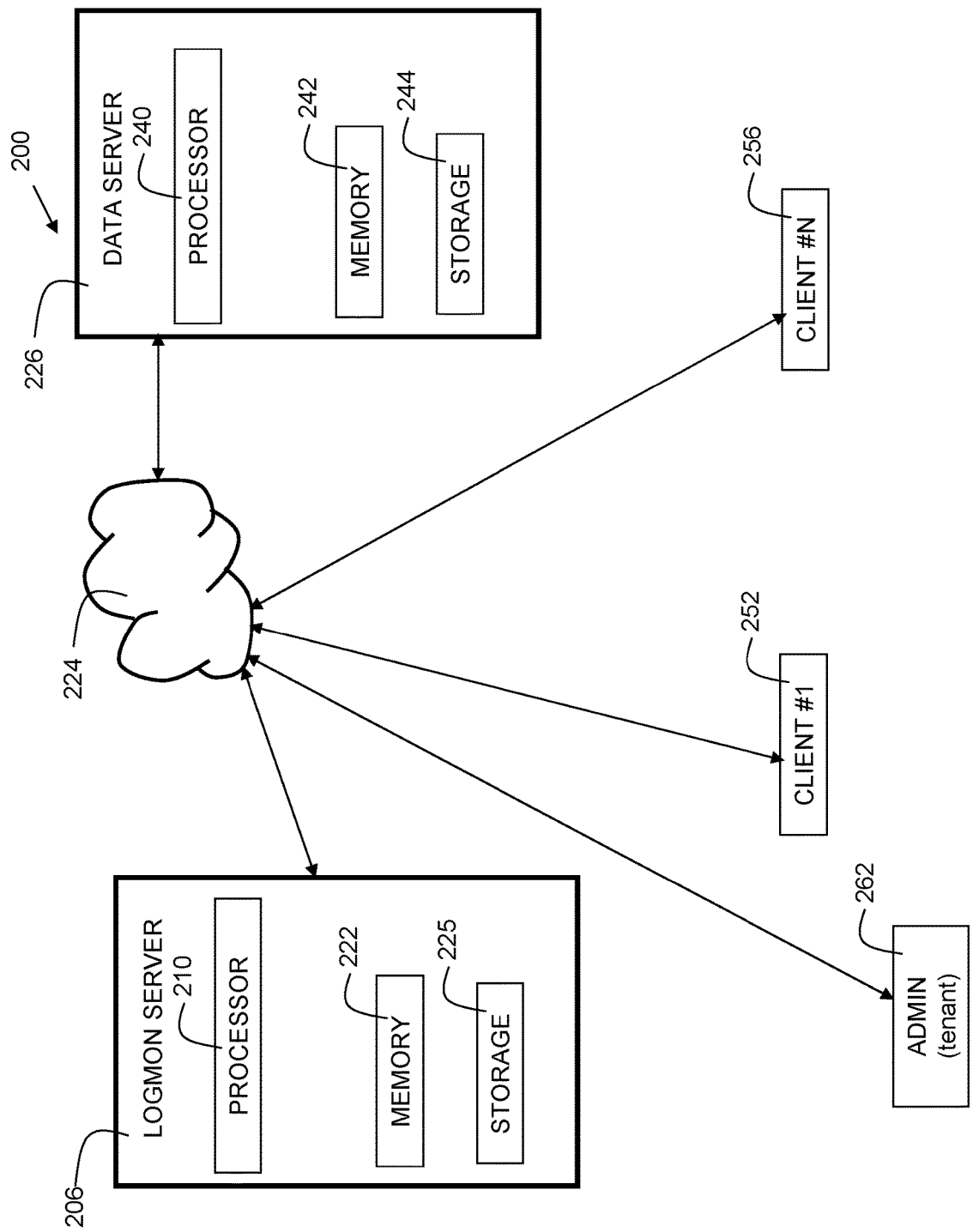
FIG. 2 is a system diagram in accordance with embodiments of the present invention.

FIG. 2 is a system diagram 200 in accordance with embodiments of the present invention. At 200, there is shown various devices in communication through a network 224. In the example, client #1 252, client #N 256, Admin 262, and two servers are shown—data server 226 and logging and monitoring server ("logmon server" in short) 206. Data server includes processor 240, memory 242, and storage 244. Logmon server 206 includes processor 210, memory 222, and storage 225. In practice, data server 226 hosts an application, and sends data relating to usage (by, for example, client #1 252 and client #N 256) to logmon server 206 for processing, which includes logging and monitoring of parameters of the usage. Logmon server 206 sends messages based on the processing to the admin 262, such as those described in FIG. 4 or 5.

In embodiments, a plurality of logging and monitoring zones are established for the networked computing environment. A "zone" is the conglomeration of a preference dataset. The preferences determine the data logging and monitoring (logmon) characteristics for a tenant of one or more cloud applications. A request is received for a cloud resource from a tenant for one or more cloud applications belonging to the tenant. A logmon preference dataset is received for each of the one or more cloud applications. Each of the one or more cloud applications is associated to a logmon zone. The tenant is billed based on selection of each logmon zone for each cloud application.

FIG. 3 is a user interface 300 for receiving a logmon preference dataset for associating a logmon zone with an application. In the example, the zone parameters are applicable to a tenant for an application named "myCloudApp", as shown at 302. Note that although the options are shown selectable using radio buttons, in other embodiments other mechanisms can be provided, such as drop down menus, check boxes, etc. Various parameters can be set by the user, including, but are not limited to the following settings.

Periodicity, at 304, refers to how often data, notifications, and/or logs should be attempted to be sent from the logmon server to the admin device. In the example, the user can choose an option corresponding to 10 minutes, 1 hour, or 3 hours. Here, since the user selects 1 hour, the logmon data will be sent from the logmon server to the admin device every hour. It should be recognized that the options shown are examples, and in other embodiments, more, fewer or different periodicity options may be provided within the scope of the invention. In some embodiments, the logmon data may only be transferred when requested by the admin device (262 of FIG. 2). In some embodiments, the logmon data is sent as soon as available. Thus, not all embodiments use a periodicity setting.

Priority level, at 306, refers to how strictly the periodicity schedule must be adhered to. For example, when the server is busy executing many tasks, it may need to prioritize the order for which tenant logmon data is to be sent if there are resource shortages or system bottlenecks. This may mean that not all logmon data will be sent on time in accordance with the periodicity schedule. In the example shown, three options are provided, including low, medium, and high priority. The higher the assigned priority of the tenant, the closer to the associated selected periodicity time frame data will be sent. In some embodiments, more, fewer, or different priority options may be provided within the scope of the invention. In the example, the user has chosen "low" for priority level, which means that the log data for the myCloud App will be sent after the data of another application having a priority level of "high" (or "medium") if they are both set to send data at an overlapping time. Thus, embodiments include receiving a logmon preference dataset including receiving a priority setting.

Size limit, at 308, refers to how much space on the server is required by the tenant and/or application. In the example, four options are provided, including 50 GB, 500 GB, 2 TB, and unlimited. An application may require a certain amount of space, and a user can make a selection here. In the example, the user has chosen 500 GB. In some embodiments, more, fewer, or different size options may be provided within the scope of the invention. Thus, embodiments include receiving a logmon preference dataset including receiving a size limit.

Verbosity level, at 310, refers to a level of filtering for the log data. In the example, three options are shown, including "info", "error", and "warn". "Info" would mean that information is sent. "Error" can indicate that there is a problem that needs immediate resolution. "Warn" could be an indication of a possible problem. Thus, embodiments include receiving a logmon preference dataset including receiving a verbosity setting below which data is not stored on the logmon server. In some embodiments, more, fewer, or different verbosity options may be provided within the scope of the invention. In the example, the user has selected "error." In embodiments, when a level of "error" is selected, logging levels below the level of error, such as warning and info are not stored on the logmon server. Thus, storage and network resources are saved by not needing to store or transmit logging messages of low severity.

Retention time, at 312, refers to the length of time the logged items should be saved until discarded. In the example, four options are shown, including "1 month", "3 months", "Until Space Needed", and "Forever." Items of log information will be saved on the logmon server for the amount of time chosen by the user. In the example, the user chose "Until Space Needed", so once the size limit of the server is met, the items of log information will be deleted from oldest to newest, as required. Thus, embodiments include receiving a logmon preference dataset including receiving a retention time. In some embodiments, more, fewer, or different retention time options may be provided within the scope of the invention.

Compression, at 314, refers to how logging information should be compressed on the logmon server. Logs can be compressed on the logmon server, and then sent in compressed form to the admin 262 (FIG. 2). In the example, three options are shown, including "None", "Level 1", and "Level 2." The user has selected "none", so log information will not be compressed for transfer to the admin device. In some embodiments, more, fewer, or different compression options may be provided within the scope of the invention. Examples of such compression include Gzip compression, XZ compression, and Lempel-Ziv (LZ) compression methods. Other lossless data compression techniques may be used instead of, or in addition to, the aforementioned techniques. Thus, embodiments include receiving a logmon preference dataset including receiving a compression option.

Encryption, at 316, refers to whether the logs should be encrypted before being sent to the admin device. In the example, options are shown, including "Yes" and "No." Encrypting the data makes it more secure during transit. This may be desirable based on the level of secrecy of the log data. In the example, the user has selected "Yes", so the log data will be encrypted for storage and transfer. Thus, embodiments include receiving a logmon preference dataset including receiving an encryption option. In some embodiments, more, fewer, or different encryption options may be provided within the scope of the invention.

In some embodiments, a new zone is computed for at least one of the one or more cloud applications based on an event relating to historical log data transfer information. The historical log data transfer information can include a history of how much log data has been transferred over a given period of time. In some embodiments, the event is a current logmon traffic level exceeding a predetermined threshold based on an established average logmon traffic metric. In some embodiments, the event is the cloud application exceeding a predetermined threshold of storage space usage. In some embodiments, the event is the cloud application using an amount of space for a threshold period of time below a predetermined threshold of the amount available. For example, using a space of less than 50 GB for a week continuously can trigger a recommendation to switch to a different zone.

Figure 4:
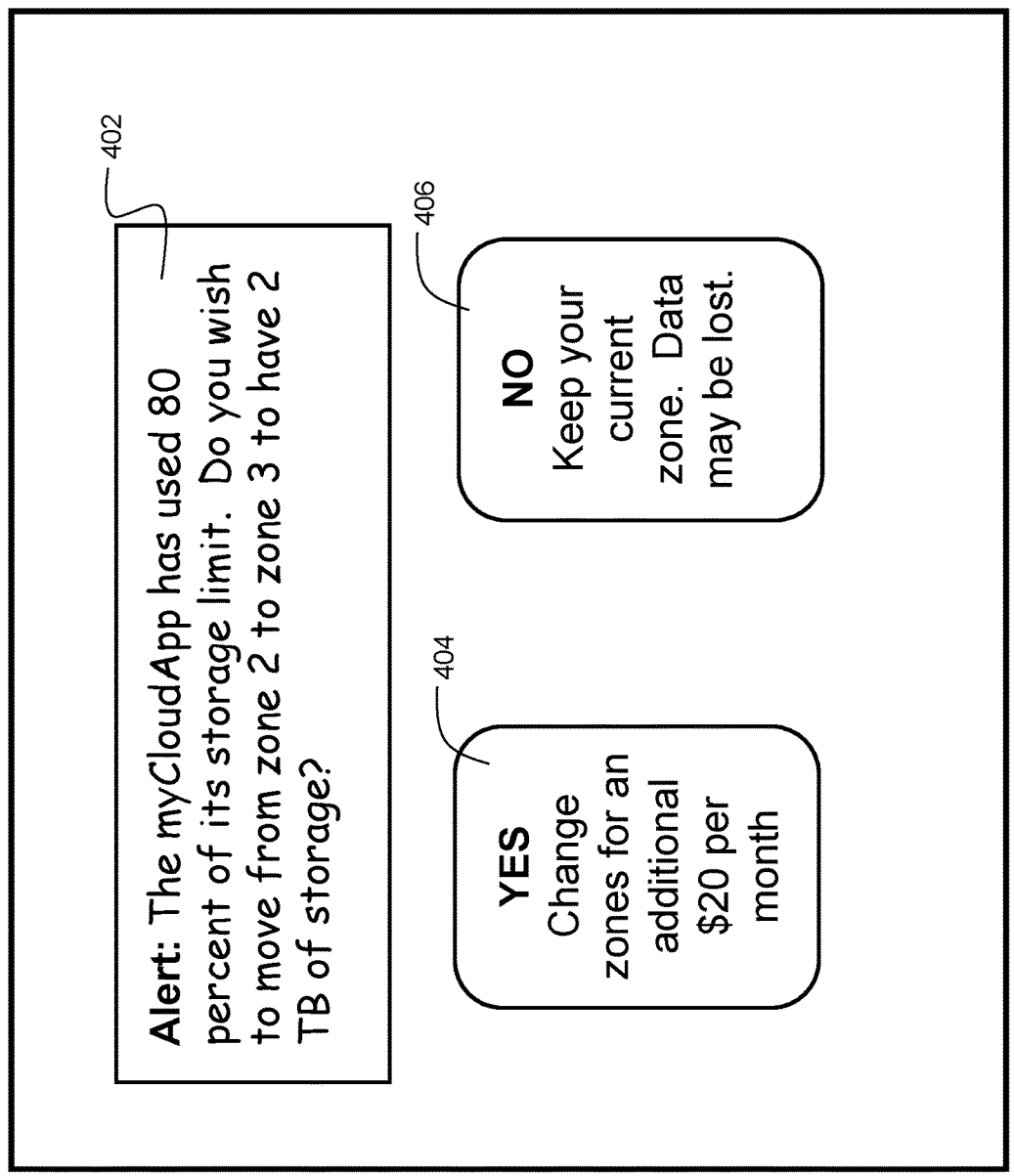
FIG. 4 is a user interface for a recommended logmon zone change in accordance with embodiments of the present invention.

FIG. 4 is a user interface 400 for a recommended logmon zone change in accordance with embodiments of the present invention. User interface 400 is an example of an administrator alert. In some embodiments, a new zone is computed for at least one of the one or more cloud applications based on historical log data transfer information. An administrator issues an alert to the client device indicating an option to switch to the new zone in response to an event. In some embodiments, the event is the exceeding of a predetermined amount of space usage. In the example shown, the predetermined amount of space usage is 80%. An alert 402 indicates, e.g. at the admin device, that the application has used 80% of its storage limit. It presents an option to the user to move from zone 2 (500 GB) to zone 3 to upgrade to 2 TB of storage. Two response options are provided, from which the user can select button 404, including "Yes" to change zones for an additional cost, or button 406 of "No" to keep the current zone. If the user selects to upgrade, the application is moved to zone 3. If not, the application remains in zone 2, and is issued a notification when the size limit is reached. Thus, embodiments include computing a new zone for at least one of the one or more cloud applications based on historical log data transfer information, and issuing an administrator alert indicating the new zone. Furthermore, embodiments can include establishing an average logmon traffic metric, and issuing an administrator alert in response to a current logmon traffic level exceeding a predetermined threshold based on the average logmon traffic metric. For example, if the average log data transfer exceeds 20 GB/per day then an administrator alert can be issued.

Figure 5:
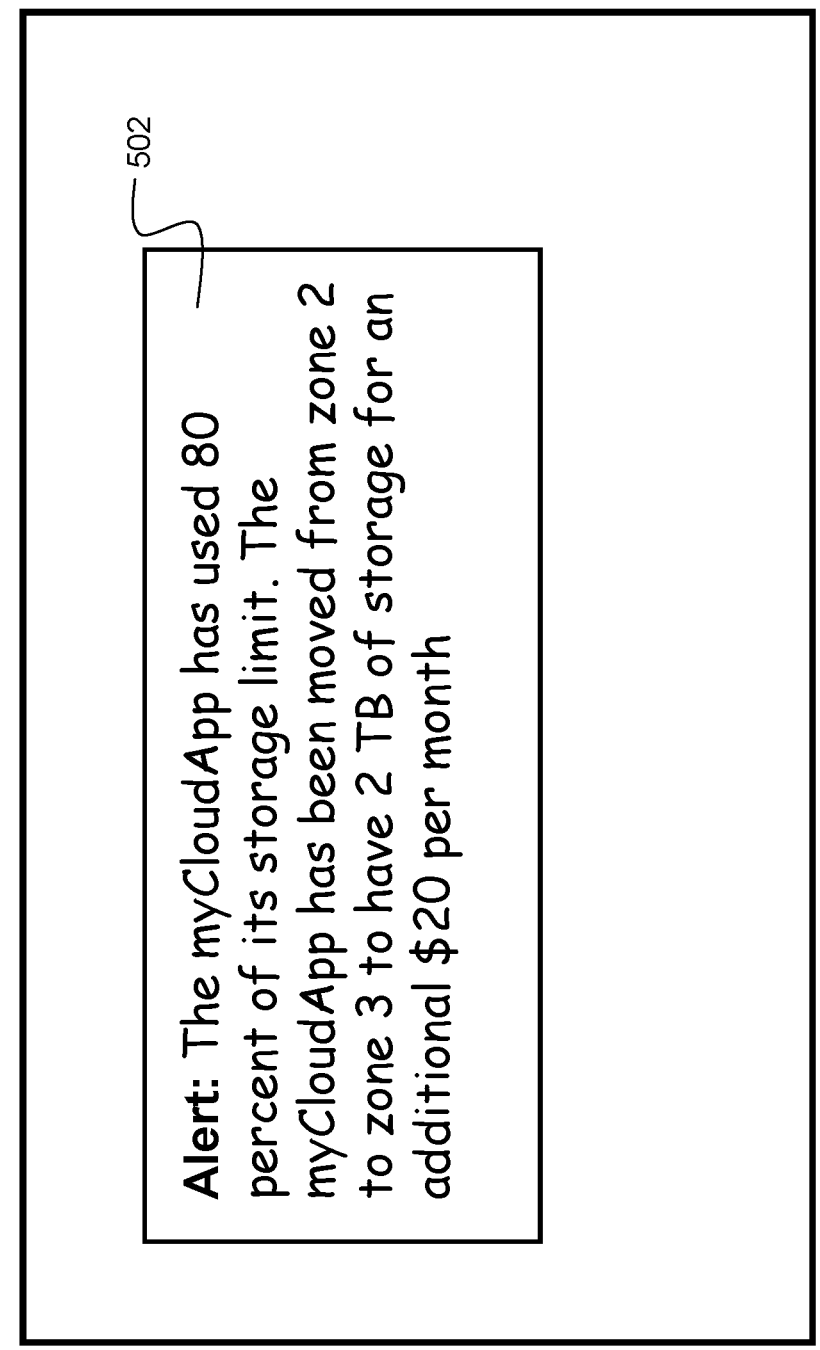
FIG. 5 is a user interface for an alert for an automatic logmon zone change in accordance with embodiments of the present invention.

FIG. 5 is a user interface 500 for an administrator alert for an automatic logmon zone change in accordance with embodiments of the present invention. In some embodiments, a new zone is computed for at least one of the one or more cloud applications based on historical log data transfer information. The logmon zone of the one or more cloud applications is automatically changed from the current zone to the new zone (without requiring user authorization first). In the example, alert 502 indicates that the application has used 80% of its storage limit, and accordingly, has been moved from zone 2 to zone 3 for an upgraded amount of storage to 2 TB for an additional cost per month. The user is receiving the notification without a request of permission. Thus, embodiments include computing a new zone for at least one of the one or more cloud applications based on historical log data transfer information, and automatically changing the logmon zone of the one or more cloud applications to the new zone. Furthermore, embodiments include issuing an administrator alert in response to automatically changing the logmon zone.

Accordingly, in some embodiments, the computing of a new zone comprises computing a new zone with a larger storage limit than the current zone. Embodiments are not limited to that, however. In some embodiments, the computing of a new zone comprises computing a new zone with data compression. The new zone and the current zone can have identical storage limits since the compressed data will take up less space than the uncompressed data. In some embodiments, the computing of a new zone comprises computing a new zone with a smaller storage limit than the current zone. For example, when an amount of space used is less than a predetermined threshold amount of space available for a predetermined period of time, the zone may be automatically changed to a lower limit, or a notification may be sent to a user for prior permission. For example, if only 60% of available space is used for 60 days, a notification like that of FIG. 4 or 5 may be sent to the user notifying of the downgrade to the lower level of space.

Figure 6:
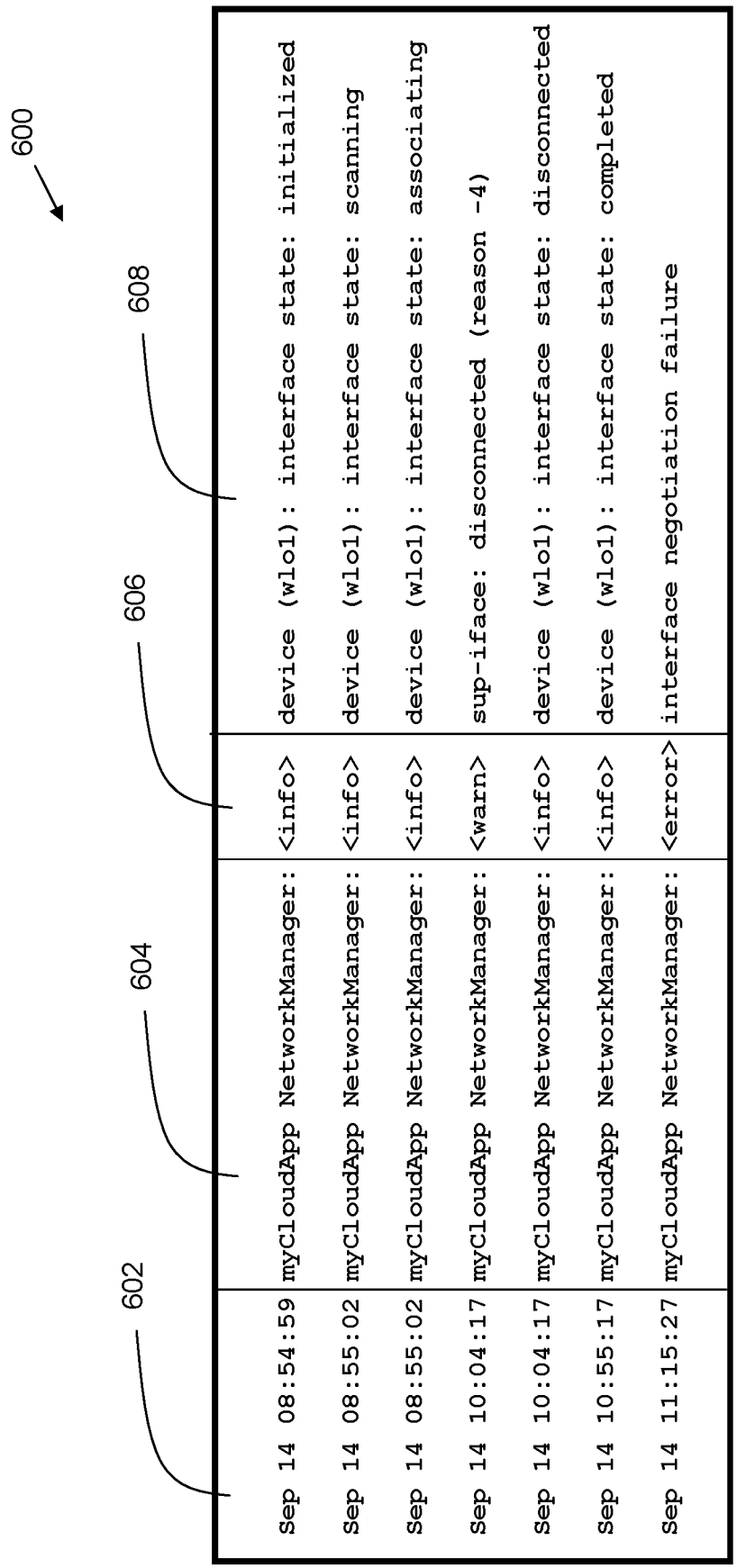
FIG. 6 is an exemplary data log.

FIG. 6 is an exemplary data log 600. As shown, the data log includes several columns. The date for each entry is shown at 602. The application to which each entry corresponds is shown at 604. The selected verbosity (selected from FIG. 3) corresponding to each application is shown at 606. The status of the application in a current zone is shown in message field 608.

Figure 7:
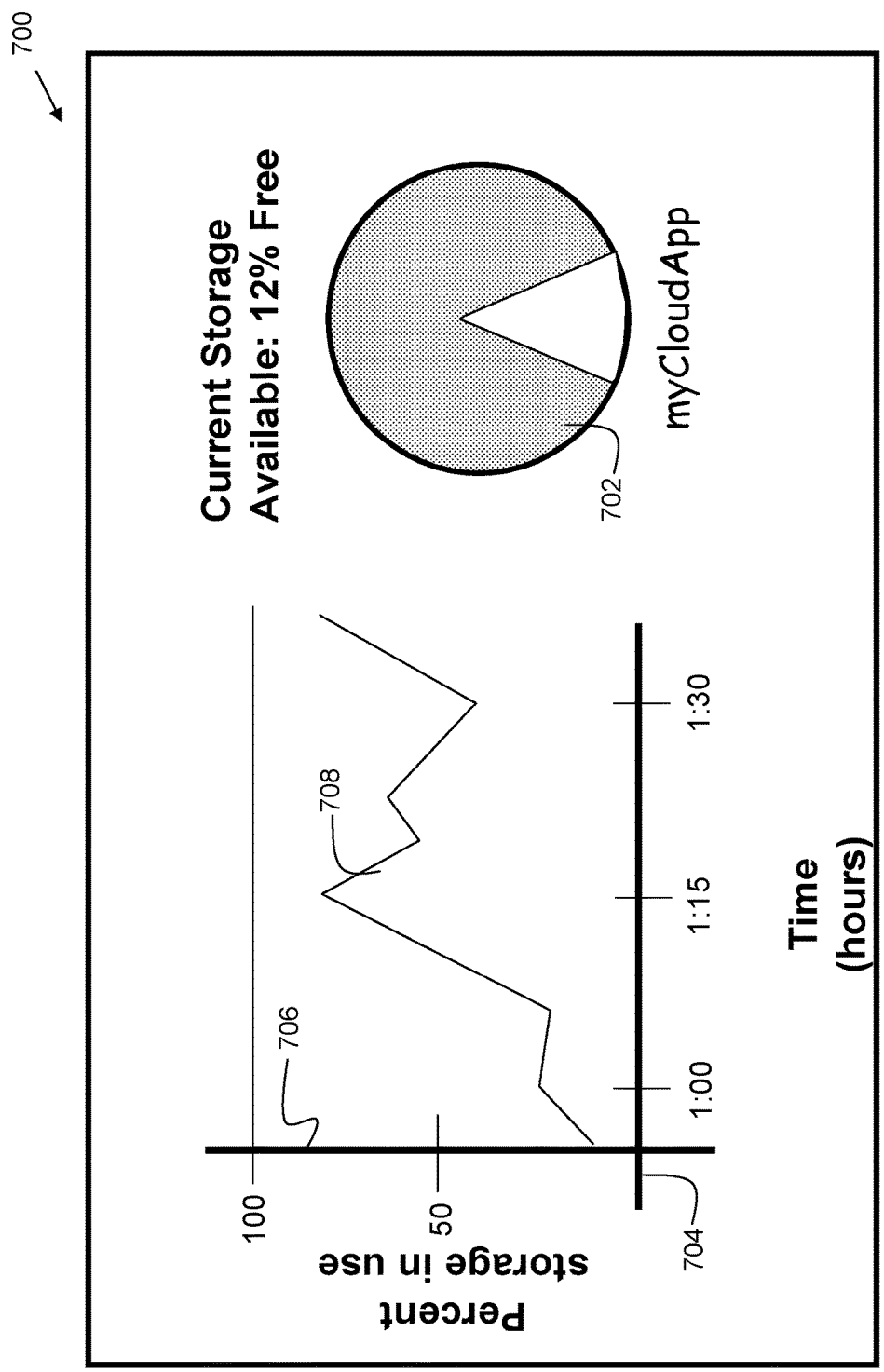
FIG. 7 is a dashboard in accordance with embodiments of the present invention.

FIG. 7 is a dashboard 700 in accordance with embodiments of the present invention. The dashboard is a rendering of logmon zone utilization. The X-axis 704 indicates length of time, and the y-axis 706 indicates percentage of storage in use. Trend line 708 shows the percentage of storage in use over time. For example, at 1:15 hours, 80% of available storage in the current zone is in use by the tenant application. Pie chart 702 shows the current amount of storage available being 20%. Trend line 708 is a graphical representation. Thus, embodiments include rendering a dashboard of logmon zone utilization, where the dashboard comprises a graphical representation of logmon zone utilization.

Figure 8:
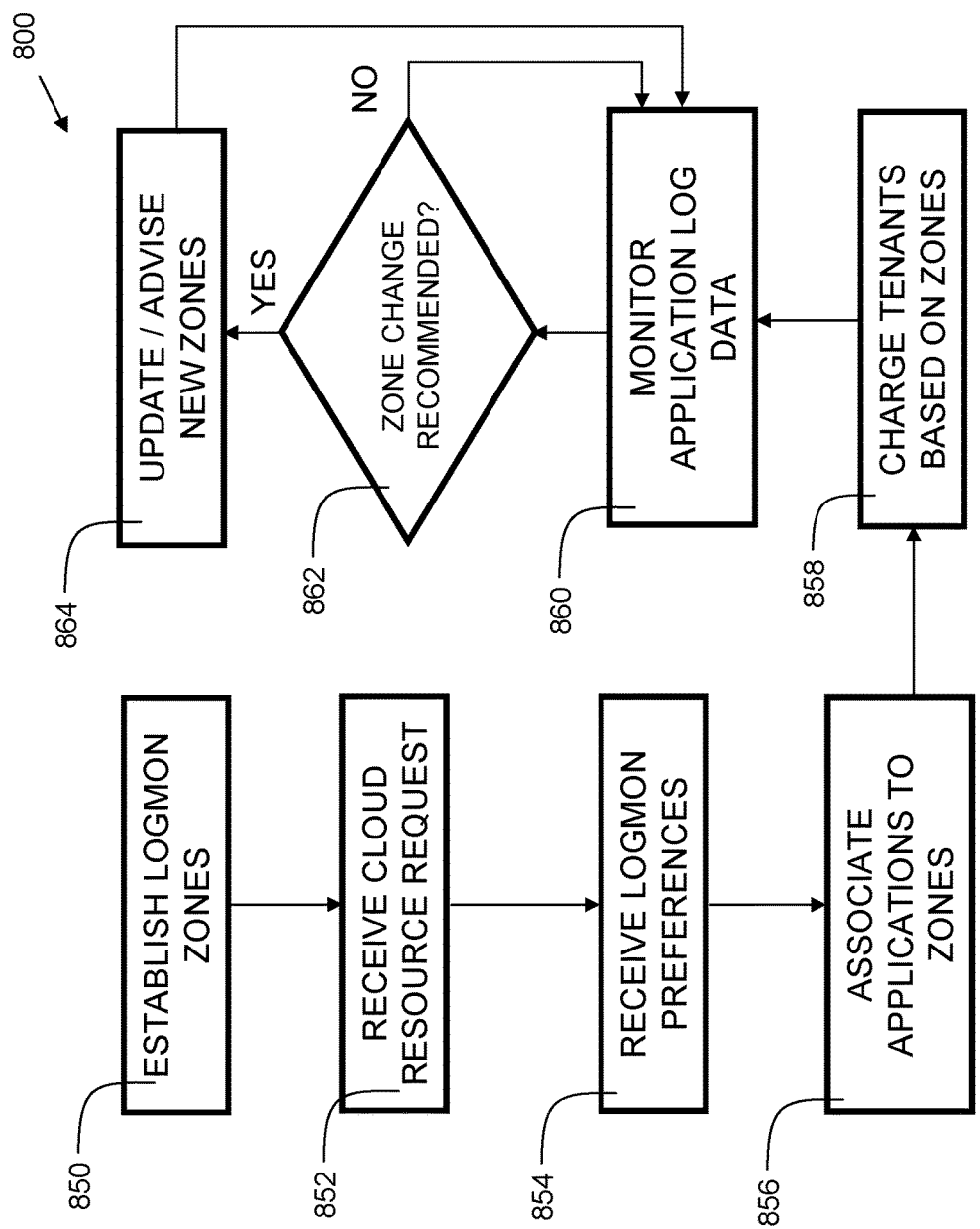
FIG. 8 is a flowchart for embodiments of the present invention.

FIG. 8 is a flowchart 800 for embodiments of the present invention. Logmon zones are established, at 850. Cloud resource requests are received at 852. Logmon preferences are received, at 854. Applications are associated to zones, at 856. Tenants are charged based on zones, at 858. Application log data is monitored, at 860. It is determined whether a zone change is recommended, at 862. If not, the process returns to 860. If yes, at 864, the application is changed to a new zone, or a notification recommending a change to a new zone is sent to the user. The notification includes an option for the user to elect for the change to a new zone. Upon receiving a positive selection, the recommended change is executed.

Examples of changing to, or recommendation of, a new zone can include computing a new zone with a larger storage limit than the current zone, computing a new zone with a smaller storage limit than the current zone, and computing a new zone with data compression, where the new zone and the current zone have identical storage limits.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
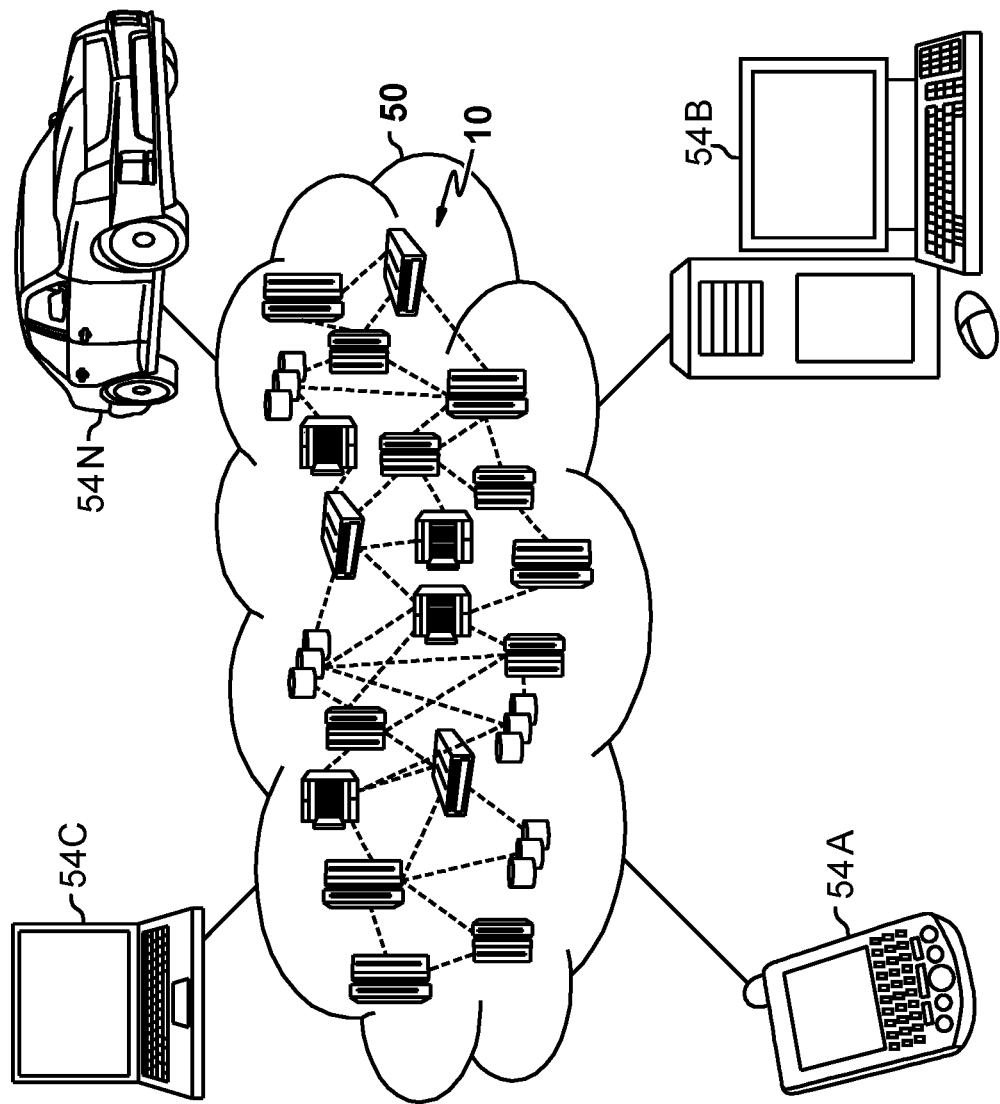
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
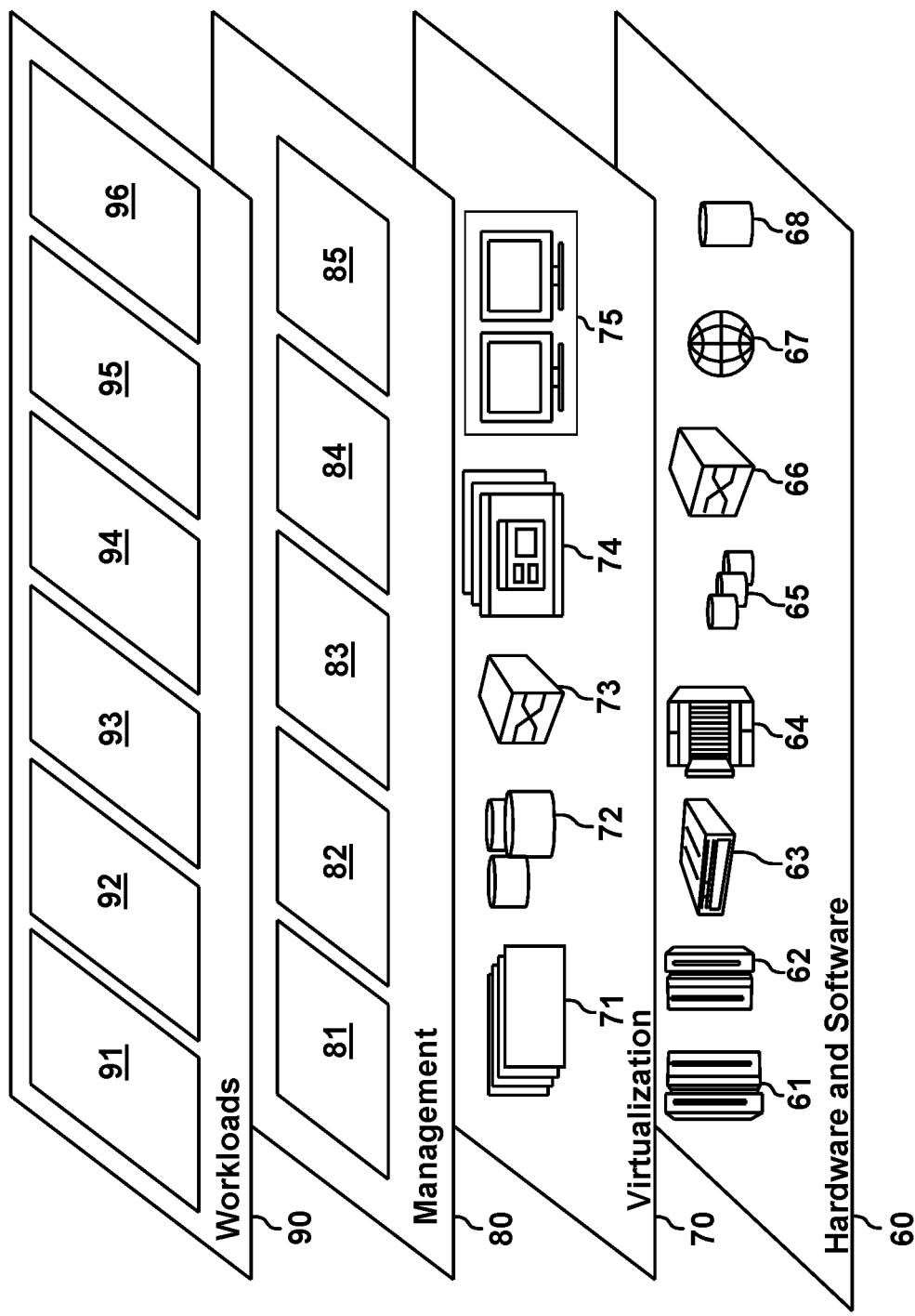
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and logging and monitoring 96. The logging and monitoring is based on zones, allowing each tenant to customize logging and monitoring based on the needs of the tenants.

As can now be appreciated, disclosed embodiments provide a more efficient way to manage data logging costs for cloud computing customers. The cloud system tenants can select logging zones that meet their needs. Furthermore, as the logging needs of cloud applications can be dynamic, embodiments allow convenient transition between zones. Thus, as logging needs change, the zones can be automatically or manually changed to accommodate changes in logging requirements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for processing application log data transfer in a networked computing environment, comprising:
    establishing a plurality of logmon zones for the networked computing environment based on logging preferences, the plurality of logmon zones including a first logmon zone that performs an ongoing logging function for a first group of cloud applications according to a first periodicity based on a set of preferences and a second logmon zone that performs the ongoing logging function for a second group of cloud applications according to a second periodicity based on a different set of preferences;
    receiving a request for a cloud resource from a tenant for one or more cloud applications belonging to the tenant;
    receiving a logmon preference dataset for each of the one or more cloud applications; and
    associating each of the one or more cloud applications to a logmon zone based on the logmon preference dataset matching the set of preferences corresponding to the logmon zone;
    determining whether logging preferences of a tenant with respect to a specific cloud application differ from the set of preferences corresponding to a current logmon zone in which the specific cloud application currently resides based on historical usage of the logging function by the application in historical log data transfer information;
    computing in response a determination that the logging preferences differ, a new zone for the cloud application of the one or more cloud applications; and automatically changing the logmon zone of the cloud application to the new zone, wherein other applications of the tenant currently residing in the current logmoon zone remain in the current logmon zone.

2. The method of claim 1, further comprising billing the tenant based on selection of each logmon zone for each cloud application, wherein at least one tenant is a tenant of a first cloud application in the first group of cloud applications in the first logmon zone and of a second application in the second group of cloud applications in the second logmon zone.

3. The method of claim 1, further comprising:
    determining whether logging preferences of a tenant with respect to a specific cloud application differ from the set of preferences corresponding to a current logmon zone in which the specific cloud application currently resides based on historical usage of the logging function by the application in historical log data transfer information;
    computing, in response to a determination that the logging preferences differ, a new zone for the cloud application of the one or more cloud applications, wherein other applications of the tenant currently residing in the current logmon zone remain in the current logmon zone; and issuing an administrator alert indicating the new zone.

4. The method of claim 3, wherein computing a new zone comprises computing a new zone with data compression, wherein the new zone and a current zone have identical storage limits.

5. The method of claim 3, wherein computing a new zone comprises computing a new zone with a larger storage limit than a current zone.

6. The method of claim 3, wherein computing a new zone comprises computing a new zone with a smaller storage limit than a current zone.

7. The method of claim 1, wherein receiving a logmon preference dataset includes receiving a compression option for each of the first logmon zone and the second logmon zone, such that compression is different for the first group of cloud of applications and the second group of cloud applications.

8. The method of claim 1, wherein receiving a logmon preference dataset includes receiving an encryption option for each of the first logmon zone and the second logmon zone, such that encryption is different for the first group of cloud of applications and the second group of cloud applications.

9. The method of claim 1, wherein receiving a logmon preference dataset includes receiving a retention time for each of the first logmon zone and the second logmon zone, such that the retention time is different for the first group of cloud of applications and the second group of cloud applications.

10. The method of claim 1, wherein receiving a logmon preference dataset includes receiving a size limit for each of the first logmon zone and the second logmon zone, such that the size limit is different for the first group of cloud of applications and the second group of cloud applications.

11. The method of claim 1, wherein receiving a logmon preference dataset includes receiving a verbosity setting for each of the first logmon zone and the second logmon zone, such that verbosity is different for the first group of cloud of applications and the second group of cloud applications.

12. The method of claim 1, wherein receiving a logmon preference dataset includes receiving a priority setting for each of the first logmon zone and the second logmon zone, such that priority is different for the first group of cloud of applications and the second group of cloud applications.

13. The method of claim 1, wherein receiving a logmon preference dataset includes receiving a periodicity setting.

14. The method of claim 1, further comprising rendering a dashboard of logmon zone utilization, wherein the dashboard comprises a graphical representation of logmon zone utilization.

15. The method of claim 1, further comprising issuing an administrator alert in response to detecting a logmon zone utilization exceeding a predetermined threshold.

16. The method of claim 1, further comprising issuing an administrator alert in response to automatically changing the logmon zone.

17. The method of claim 1, further comprising:
establishing an average logmon traffic metric; and
issuing an administrator alert in response to a current logmon traffic level exceeding a predetermined threshold based on the average logmon traffic metric.

18. A computer system comprising:
a processor;
a memory coupled to the processor, the memory containing instructions, that when executed by the processor, perform the steps of:
establishing a plurality of logmon zones for a networked computing environment based on logging preferences, the plurality of logmon zones including a first logmon zone that performs an ongoing logging function for a first group of cloud applications according to
a first periodicity based on a set of preferences and a second logmon zone that performs the ongoing logging function for a second group of cloud applications according to a second periodicity based on a different set of preferences;
receiving a request for a cloud resource from a tenant for a plurality of cloud applications belonging to the tenant;
receiving a logmon preference dataset for each cloud application of the plurality of cloud applications; and
associating each cloud application of the plurality of cloud applications to a logmon zone based on the logmon preference dataset matching the set of preferences corresponding to the logmon zone such that at least one cloud application of the plurality of cloud applications is associated with the first logmon zone and at least one other cloud application of the plurality of cloud applications is associated with the second logmon zone;
determining whether logging preferences of a tenant with respect to a specific cloud application differ from the set of preferences corresponding to a current logmon zone in which the specific cloud application currently resides based on historical usage of the logging function by the application in historical log data transfer information;
computing in response a determination that the logging preferences differ, a new zone for the cloud application of the one or more cloud applications; and automatically changing the logmon zone of the cloud application to the new zone, wherein other applications of the tenant currently residing in the current logmoon zone remain in the current logmon zone.

19. A computer program product for processing application log data transfer in an electronic computing device comprising a computer readable storage medium having program instructions embodied therewith, the program instructions executable by a processor to cause the electronic computing device to:
establish a plurality of logmon zones for a networked computing environment based on logging preferences, the plurality of logmon zones including a first logmon zone that performs an ongoing logging function for a first group of cloud applications according to a first periodicity based on a set of preferences and a second logmon zone that performs the ongoing logging function for a second group of cloud applications according to a second periodicity based on a different set of preferences;
receive a request for a cloud resource from a tenant for one or more a plurality of cloud applications belonging to the tenant;
receive a logmon preference dataset for each cloud application of the one or more plurality of cloud applications; and
associate each cloud application of the plurality of cloud applications belonging to the tenant to a logmon zone based on the logmon preference dataset matching the set of preferences corresponding to the logmon zone such that at least one cloud application of the plurality of cloud applications is associated with the first logmon zone and at least one other cloud application of the plurality of cloud applications is associated with the second logmon zone;

determining whether logging preferences of a tenant with respect to a specific cloud application differ from the set of preferences corresponding to a current logmon zone in which the specific cloud application currently resides based on historical usage of the logging function by the application in historical log data transfer information; computing in response a determination that the logging preferences differ, a new zone for the cloud application of the one or more cloud applications; and automatically changing the logmon zone of the cloud application to the new zone, wherein other applications of the tenant currently residing in the current logmoon zone remain in the current logmon zone.

\* \* \* \* \*